(12) United States Patent  
Horton

(10) Patent No.: US 10,879,719 B2  
(45) Date of Patent: Dec. 29, 2020

(54) REGULATOR CONTROL CIRCUIT

(71) Applicant: Haldex Brake Products Aktiebolag, Landskrona (SE)

(72) Inventor: Steven Horton, Lindely (GB)

(73) Assignee: Haldex Brake Products Aktiebolag, Landskrona (SE)

( * ) Notice: Subject to any disclaimer, the term of this patent is extended or adjusted under 35 U.S.C. 154(b) by 0 days.

(21) Appl. No.: 16/086,509

(22) PCT Filed: Mar. 17, 2017

(86) PCT No.: PCT/GB2017/050739  
§ 371 (c)(1),  
(2) Date: Sep. 19, 2018

(87) PCT Pub. No.: WO2017/163026  
PCT Pub. Date: Feb. 28, 2017

(65) Prior Publication Data  
US 2019/0103753 A1     Apr. 4, 2019

(30) Foreign Application Priority Data  
Mar. 21, 2016 (GB) .................... 1604753.2

(51) Int. Cl.  
*H02J 7/00* (2006.01)  
*G05F 1/565* (2006.01)  
(Continued)

(52) U.S. Cl.  
CPC ........ *H02J 7/007184* (2020.01); *G05F 1/565* (2013.01); *H02J 7/00718* (2020.01); *H02M 3/156* (2013.01); *H02M 3/33507* (2013.01)

(58) Field of Classification Search  
USPC ...................................................... 320/160  
See application file for complete search history.

(56) References Cited

U.S. PATENT DOCUMENTS 3,854,082 A * 12/1974 Nasby .................... H02J 7/008  
                                                               320/160  
7,246,015 B2 * 7/2007 Bertness .............. G01R 31/007  
                                                                320/104  
(Continued)

FOREIGN PATENT DOCUMENTS

EP        1 860 752 A1     11/2007

OTHER PUBLICATIONS

International Search Report dated Aug. 14, 2017, International Application No. PCT/GB2017/050739.

*Primary Examiner* — Samuel Berhanu  
(74) *Attorney, Agent, or Firm* — Young Basile Hanlon & MacFarlane, P.C.

(57) ABSTRACT

A regulator control circuit which is configured to control a switching regulator: a feedback comparator configured to compare a signal representative of a reference voltage with a signal representative of a voltage output of the switching regulator and to output a control signal for controlling the operation of the switching regulator dependent on the signals received by the feedback comparator; and a current feedback controller connected to the feedback comparator and configured to receive a signal representative of a current output by the switching regulator and determine whether the regulator control circuit adopts a first or second mode of operation based on the signal representative of a current output, such that, in the first mode of operation, the control signal is for controlling the switching regulator in accordance with a constant voltage control scheme and, in the second mode of operation, the control signal is for controlling the switching regulator in accordance with a constant current control scheme.

14 Claims, 4 Drawing Sheets

(51) Int. Cl.
*H02M 3/335* (2006.01)
*H02M 3/156* (2006.01)

(56) References Cited

U.S. PATENT DOCUMENTS

| | | | |
|---|---|---|---|
| 2006/0108971 A1* | 5/2006 | Ono | H02J 7/1461 |
| | | | 320/104 |
| 2009/0033294 A1* | 2/2009 | Odajima | H02J 7/0029 |
| | | | 320/166 |
| 2010/0033136 A1 | 2/2010 | Yang | |
| 2010/0244788 A1* | 9/2010 | Chen | H02M 3/1584 |
| | | | 323/234 |
| 2012/0091970 A1* | 4/2012 | Cho | H02J 7/022 |
| | | | 320/160 |
| 2012/0268039 A1 | 10/2012 | Chen | |
| 2013/0043828 A1 | 2/2013 | Gurlahosur | |
| 2013/0154579 A1 | 6/2013 | Morita et al. | |
| 2013/0200847 A1* | 8/2013 | Kurokawa | H02J 7/0031 |
| | | | 320/112 |
| 2013/0221905 A1* | 8/2013 | Holloway | H02J 7/0054 |
| | | | 320/107 |
| 2013/0250629 A1 | 9/2013 | Xu | |
| 2014/0002021 A1* | 1/2014 | Bertness | B60L 58/26 |
| | | | 320/109 |
| 2014/0203763 A1* | 7/2014 | Zhao | H02J 7/0081 |
| | | | 320/107 |
| 2014/0292288 A1 | 10/2014 | Yan et al. | |
| 2015/0333750 A1* | 11/2015 | Bateriwala | H02J 7/0081 |
| | | | 320/166 |

* cited by examiner

REGULATOR CONTROL CIRCUIT

CROSS-REFERENCE TO RELATED APPLICATIONS

This application is the national stage application of, and claims priority to, International Application No. PCT/GB2017/050739 filed Mar. 17, 2017, which was published as International Publication No. WO 2017/163026. International Application No. PCT/GB2017/050739 claims the benefit of United Kingdom Patent Application No. 1604753.2 filed Mar. 21, 2016.

DESCRIPTION OF INVENTION

Embodiments of the present invention relate to electrical supply control circuits for regulating a supply voltage to track a reference voltage. In particular, some embodiments relate to electrical supply control circuits for using in powering analogue circuits which may form part of a braking system of a vehicle.

Some vehicle electrical systems use analogue sensors and other devices which, for their correct operation, need to be powered by an electrical supply with a voltage which tracks a reference voltage used by an analogue-to-digital converter (ADC).

For vehicles, there is often a requirement for this electrical supply and the system implemented to track the reference voltage to be able to handle overloads—which may include a short circuit and/or connection to the main vehicle electrical supply (which may be as high as 42V).

Some previous systems use linear or switching tracking regulators; however, these systems commonly revert to a linear current limit dissipating several watts of power during overload situations, particularly when a large supply voltage range has to be accommodated.

Various other previous systems suffer from other problems, such as a lack of electrical supply in some fault situations or limited current characteristics.

Whilst described specifically in relation to a vehicle electrical supply system, and a braking system of a vehicle, it will be appreciated that some embodiments will be applicable to other electrical supply systems and/or to systems other than braking systems.

There is a need, therefore, to alleviate the problems with the prior art.

Accordingly, an aspect of the present invention provides a regulator control circuit which is configured to control a switching regulator: a feedback comparator configured to compare a signal representative of a reference voltage with a signal representative of a voltage output of the switching regulator and to output a control signal for controlling the operation of the switching regulator dependent on the signals received by the feedback comparator; and a current feedback controller connected to the feedback comparator and configured to receive a signal representative of a current output by the switching regulator and determine whether the regulator control circuit adopts a first or second mode of operation based on the signal representative of a current output, such that, in the first mode of operation, the control signal is for controlling the switching regulator in accordance with a constant voltage control scheme and, in the second mode of operation, the control signal is for controlling the switching regulator in accordance with a constant current control scheme.

The second mode may be adopted when the signal representative of the current output by the switching regulator exceeds a predetermined current.

The current feedback controller may be configured to modify the signal representative of the voltage output of the switching regulator in order to cause the adoption of the second mode.

The circuit may further include a first drive switch circuit which is configured to receive an output from the current feedback controller and selectively to control an input of the current feedback controller dependent on the output from the current feedback controller.

The circuit may further include a regulator drive circuit which is configured to receive the output from the feedback comparator and to control the operation of the switching regulator in accordance with the output from the feedback comparator.

The circuit may be further configured to clamp the output of the switching regulator to a clamp voltage and to modify the control signal to disable the switching regulator when the signal representative of the voltage output of the switching regulator and the signal representative of the reference voltage indicate that the voltage output is higher than the reference voltage.

The circuit may further include an output voltage transient protection circuit configured to protect the feedback comparator from high voltage transients in the output voltage.

The current feedback controller may be further configured to determine whether the regulator control circuit adopts a fourth mode of operation in which hybrid pulse width and pulse frequency modulation is used to control the operation of the switching regulator.

Another aspect provides a sensor circuit including a regulator control circuit as above, the switching regulator, and at least one sensor connected to the output of the switching regulator.

The signal representative of the reference voltage may be a signal representative of a reference voltage of an analogue-to-digital converter which is configured to receive an output from the at least one sensor.

Another aspect may provide a braking system for a vehicle including a regulator control circuit as above or a sensor circuit as above.

Another aspect provides a vehicle including a braking system as above or a regulator control circuit as above or a sensor circuit as above.

Embodiments of the present invention are described, by way of example only, with reference to the accompanying drawings, in which.

Figure 1:
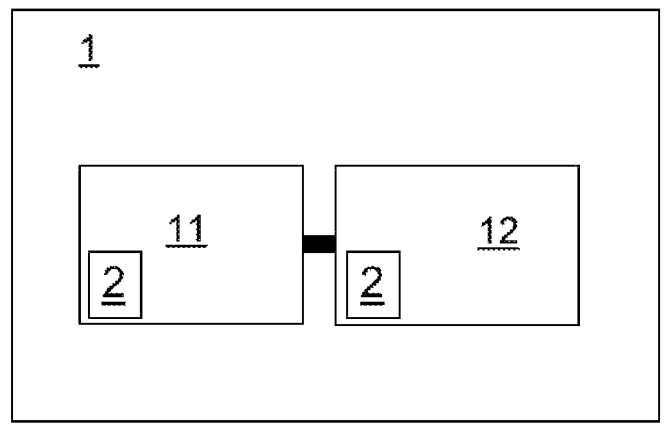
FIG. 1 shows a schematic representation of a vehicle according to some embodiments.

In some embodiments, see FIG. 1 for example, the present invention includes a vehicle 1 to which a braking system 2 has been fitted. The vehicle 1 may include a truck 11 and trailer 12, the trailer 12 being configured to be towed by the truck 11. The braking system 2 may, therefore, include a portion which is part of the truck 11 and a portion which is part of the trailer 12. Other configurations of the braking system 2 and vehicle 1 may, however, be used in other embodiments.

Figure 2:
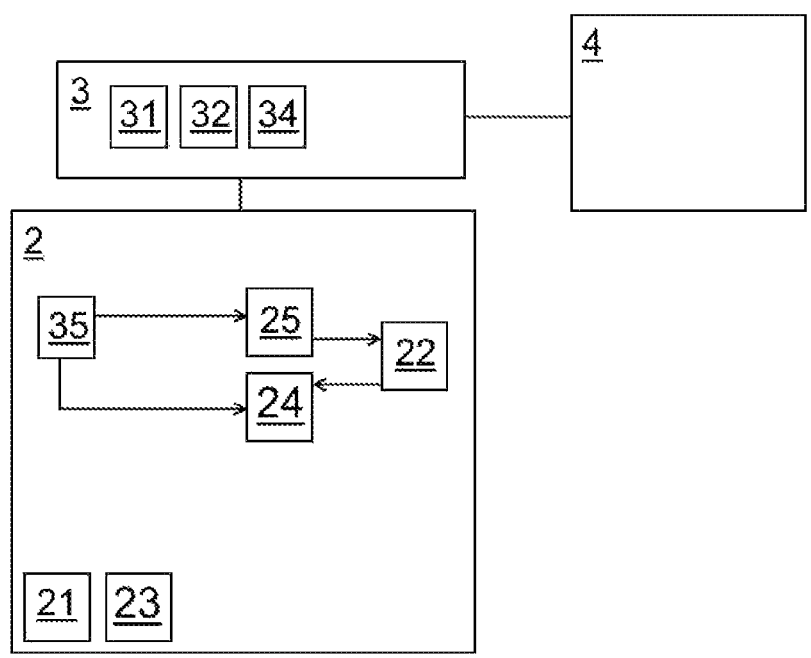
FIG. 2 shows a schematic representation of a braking system and electrical supply system of some embodiments.

The braking system 2, with reference to FIG. 2, includes a brake module 21 which is configured, on actuation, to apply a braking force to one or more ground engaging wheels of the vehicle 1 (e.g. of the truck 11 and/or trailer 12) in order to slow the vehicle 1 and/or substantially prevent its movement. The braking system 2 may also include one or more analogue sensors 22.

The or each analogue sensor 22 may be configured to measure a parameter associated with the operation of the vehicle 1 (which may include a parameter associated with the operation of the truck 11, and/or of the trailer 12, and/or of the braking system 2 [which may include the braking module 21]). Examples of such analogue sensors 22 may include pressure sensors, position sensors, temperature sensors, and acceleration sensors. In some embodiments, the or each analogue sensor 22 may include a sensor which measures the speed of the vehicle 1 (which may be the speed of the truck 11 or trailer 12) and/or may be configured to measure the speed of rotation of one or more ground engaging wheels of the vehicle 1 (which may include a ground engaging wheel of the truck 11 and/or the trailer 12). The or each analogue sensor 22 may include a potentiometric sensor device.

The or each analogue sensor 22 may be used by other parts of the braking system 2 to determine one or more parameters regarding the operation of the vehicle 1 or braking system 2, so that another aspect of the braking system 2 can be controlled based, at least in part, on the one or more parameters.

Accordingly, the braking system 2 may include a braking system controller 23 which is configured to receive the one or more parameters from the one or more analogue sensors 22 and to output a control signal to part of the braking system 2 (e.g. to the braking module 21), the control signal being at least partly based on the one or more received parameters.

The braking system 2 may include an analogue-to-digital converter (ADC) 24 which is configured to receive an analogue signal representative of a parameter from an analogue sensor 22 of the one or more analogue sensors 22. The ADC 24 may be configured to convert the received analogue signal into a digital signal which is then provided, by the ADC 24, to the braking system controller 23—which may be a digital controller (such as a microcontroller or microprocessor device).

In some embodiments, the braking system 2 includes a plurality of ADCs 24, each associated with a different analogue sensor 22. In some embodiments, a plurality of analogue sensors 22 are associated with the same ADC 24 and the braking system 2 includes a multiplexing device (not shown) which is configured to multiplex the analogue signals output by the plurality of analogue sensors 22 such that the ADC 24 operates on each analogue signal separately in turn.

The or each analogue sensor 22 may be configured to output an analogue signal in which the parameter being sensed is encoded in changes in the voltage of the analogue signal output by the analogue sensor 22.

The or each analogue sensor 22 may, therefore, require an electrical supply, e.g. via an electrical supply system 3, which has a predetermined relationship with a reference voltage associated with the ADC 24—such that the ADC 24 correctly translates the or each received analogue signal into the appropriate digital signal for use by the braking system controller 23. As will be understood, analogue sensors 22 are one example of a component which requires an electrical supply which has a predetermined relationship with a reference voltage (e.g. a reference voltage associated with the ADC 24). Embodiments of the present invention are described, for ease of reference, in relation to one or more analogue sensors 22 but may equally be used with other examples of such components requiring this predetermined relationship.

This reference voltage may be provided by a reference voltage output 35 of the electrical supply system 3 of the vehicle 1 or of the braking system 2, for example. The reference voltage output 35 may be connected in electrical communication to a reference voltage regulator (not shown) which is configured to reduce or translate the reference voltage output 35 into the reference voltage (which may be a lower voltage than the voltage of the reference voltage output 35). In some embodiments, the reference voltage regulator is part of the electrical supply system 3 and, in some embodiments, the reference voltage regulator is part of the braking system 2.

The vehicle 1 includes an electrical supply system 3, see FIG. 2, which is configured to provide electrical power to one or more units of the vehicle 1, including the braking system 2 and/or a lighting system 4, if provided.

The electrical supply system 3 may include a battery 31 and a generation system 32 (such as an electrical alternator or other generator) which is configured to generate electricity using mechanical power generated by an engine of the vehicle 1, for example. The electrical supply system 3 may include an ignition or other power line 34 which is configured, with a ground line, to supply electricity to the one or more units of the vehicle 1. In this instance, the voltage of the electricity supplied through the electrical supply system 3 may be 12V, 24V, or 32V, for example. The battery 31—if provided—may be configured to provide electrical power at any one of these voltages. As mentioned above, in some embodiments, the electrical supply system 3 is also configured to output a reference voltage output 35.

In some embodiments, the reference voltage is at a level suitable for use by logic circuits (such as the ADC 24, and/or the braking system controller 23). In some embodiments, the reference voltage may be about 3V or 5V. The reference voltage is subject to variations during operation of the vehicle 1—which may be due to other demands on the electrical supply system 3 of the vehicle 1 (e.g. during cranking) but could also be the result of faults or the result of connection of an electrical system of the truck 11 with an electrical system of the trailer 12 (or a part of the braking system 2 of the truck 11 with a part of the braking system 2 of the trailer 12).

In embodiments of the invention, an electrical supply control system 25 is provided as part of the braking system 2 or otherwise (e.g. as part of the vehicle 1 more generally, which may include being part of the truck 11 and/or trailer 12).

The electrical supply control system 25 is configured to be coupled in electrical communication with the ignition or other power line 34 and to the electrical power output over the ignition or other power line 34 to a sensor power output for use by the one or more analogue sensors 22.

In some embodiments, the electrical supply control system 25 is configured to convert the voltage of power delivered over the ignition or other power line 34 to a sensor voltage, wherein the sensor voltage substantially tracks the reference voltage—i.e. a substantially constant voltage. In some embodiments, the electrical supply control system 25 is configured to provide the sensor power output at a substantially constant current.

In some embodiments, the electrical supply control system 25, and/or the ADC 24 and/or the reference voltage output 35 may form part of the braking system controller 23.

Figure 3:
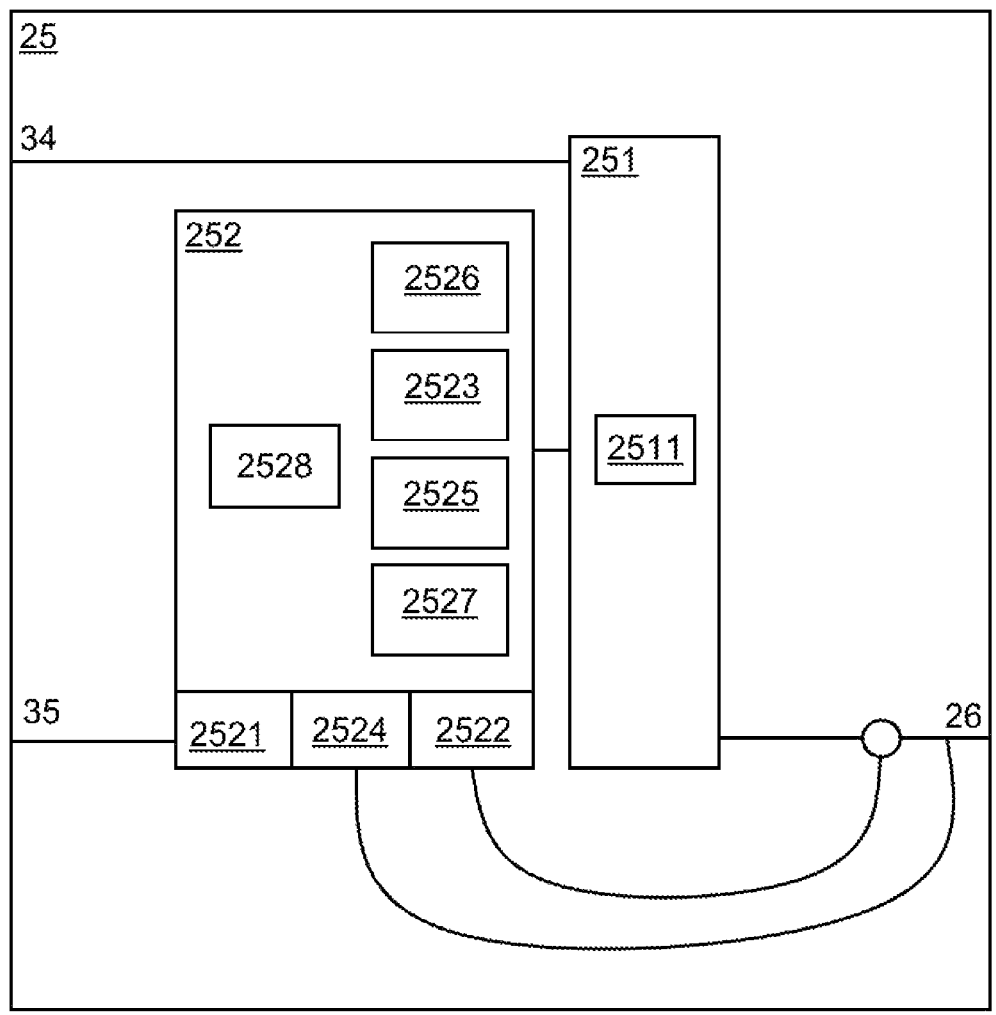
FIGS. 3 and 4 show a schematic representation of a regulator control circuit and switching regulator of some embodiments.

With reference to, for example, FIG. 3, some embodiments of the electrical supply control system 25 include a switching regulator 251 and a regulator control circuit 252.

The switching regulator 251 is configured to receive electrical power from the electrical supply system 3 (e.g. via the ignition or other power line 34) and to convert that electrical power into the sensor power output. The operation of the switching regulator 251 is controlled by the regulator control circuit 252 which is configured to provide two or more modes of operation.

In accordance with a first mode of operation of the regulator control circuit 252, the switching regulator 251 is controlled to provide the sensor power output at the sensor voltage which tracks the reference voltage—i.e. a substantially constant voltage (albeit subject to some variations in practice).

In accordance with a second mode of operation of the regulator control circuit 252, the switching regulator 251 is controlled to provide the sensor power output at a substantially constant current.

In accordance with an optional third mode of operation of the regulator control circuit 252, the switching regulator 251 substantially prevents connection of the sensor power output to the ignition or other power line 34 (i.e. the switching regulator 251 may be substantially disabled). This mode of operation may be used, for example, if a fault occurs or is expected (e.g. a short circuit fault as described herein).

In some embodiments, the regulator control circuit 252 may be configured to control the operation of the switching regulator 251 to provide pulse frequency modulated control of the switching regulator 251. In some embodiments, other forms or techniques of control are possible, such as pulse width modulated control. In some embodiments, the regulator control circuit 252 is configured to control the operation of the switching regulator 251 to provide a hybrid pulse width and pulse frequency modulated control of the switching regulator 251—in such a hybrid, pulse width modulation may be used except when the load on the sensor power output is below a threshold when one or more pulses may be omitted (providing a degree of pulse frequency modulation). This may be viewed, in some embodiments, as a fourth mode of operation.

The switching regulator 251 may, in some embodiments, include a power switch device 2511 which may be a transistor device and may be, for example, a PNP transistor device. The switching regulator 251 may further include an energy storage element 2512 such as an inductor. The switching regulator 251 may further include a diode 2513.

Figure 4:
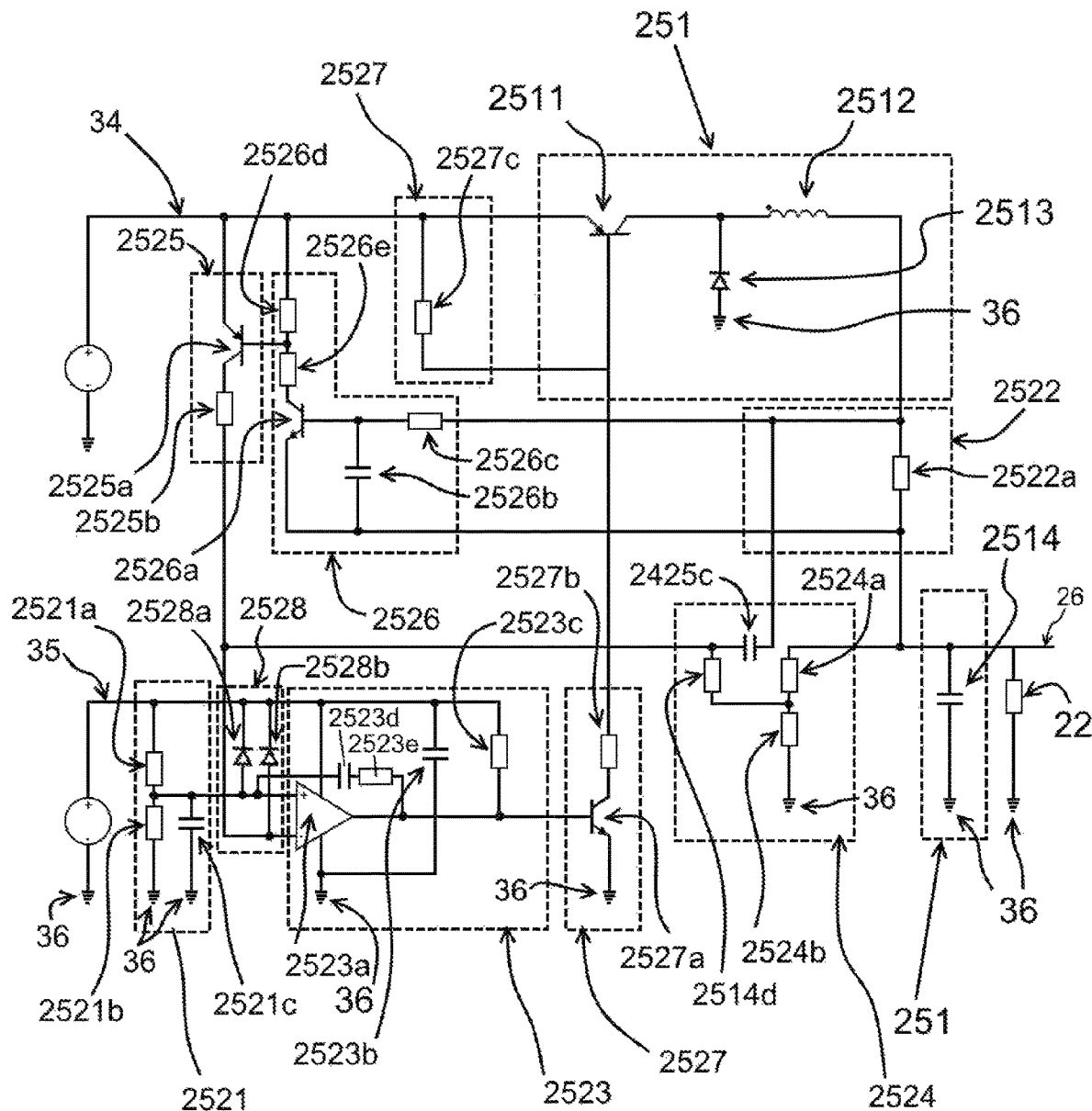

In some embodiments, such as in the embodiment depicted in FIG. 4, the power switch device 2511 is connected in series with the energy storage element 2512. The power switch device 2511 is further connected in series with the ignition or other power line 34. Accordingly, the ignition or other power line 34 may be connected in selective electrical communication with the energy storage element 2512. With the power switch device 2511 in an on-state, the ignition or other power line 34 may be connected in electrical communication with the energy storage element 2512 such that the energy storage element 2512 is charged. With the power switch device 2511 in an off-state, the ignition or other power line 34 may be disconnected from electrical communication with the energy storage element 2512 which may, as a result, discharge. The diode 2513 may be connected in electrical communication with both the power switch device 2511 and the energy storage element 2512 and may remain in electrical communication with the energy storage element 2512 irrespective of the on- or off-state of the power switch device 2511. Accordingly, the diode 2513 may be oriented to allow the charging of the energy storage element 2512 with the power switch device 2511 in the on-state and to allow the discharging of the energy storage element 2512 with the power switch device 2511 in the off-state.

The energy storage element 2512 may be connected to a sensor voltage line 26 such that the discharging of the energy storage element 2512 is to the sensor voltage line 26.

A capacitor 2514 of the switching regulator 251 may be connected between the sensor voltage line 26 and a ground connection or line 36.

The actuation of the power switch device 2511 between the on- and off-states is controlled by the regulator control circuit 252. In the case of the power switch device 2511 being a transistor device, therefore, the base of the power switch device 2511 is connected in electrical communication with the regulator control circuit 252.

In the embodiment depicted in FIG. 4, for example, the power switch device 2511 is a PNP transistor device with its emitter connected in electrical communication with the ignition or other power line 34 and its collector connected in electrical communication with the energy storage element 2512 (and diode 2513, which is also connected in electrical communication with the ground connection or line 36). The base of the power switch device 2511 of the embodiment of FIG. 4 is, as discussed above, connected in electrical communication with the regulator control circuit 252.

The regulator control circuit 252 is connected in electrical communication with the switching regulator 251 and, in some embodiments in particular, with the power switch device 2511 thereof.

The regulator control circuit 252 is also configured to receive a signal indicative of the voltage of the reference voltage output 35 and a signal representative of the electrical current provided by the switching regulator 251 to the sensor voltage line 26 (i.e. the current drawn through the sensor voltage line 26, e.g. by the one or more analogue sensors 22).

Accordingly, the regulator control circuit 252 may include a reference voltage input 2521 (which is configured to receive the signal indicative of the voltage of the reference voltage output 35) and a current sense circuit 2522 which is configured to sense the current flowing from the switching regulator 251 to the sensor voltage line 26.

The reference voltage input 2521 may include a connection to the reference voltage output 35. This connection may be via one or more resistors and/or capacitors of the reference voltage input 2521 which serve to reduce and/or filter the voltage of the reference voltage output 35 prior to use in other parts of the regulator control circuit 252.

In particular, the reference voltage input 2521 may include a potential divider circuit formed from a first resistor 2521a which is connected (or connectable) in electrical communication with the reference voltage output 35 at a first terminal of the first resistor 2521a, a second terminal of the first resistor 2521a being connected in electrical communication with a first terminal of a second resistor 2521b of the reference voltage input 2521. A second terminal of the second resistor 2521b may be connected to the ground connection or line 36. A capacitor 2521c of the reference voltage input 2521 may be connected in parallel with the second resistor 2521b to provide filtering which reduces the effects of transient (relatively high frequency) variations in the voltage of the reference voltage output 35 on other parts of the regulator control circuit 252.

The reference voltage input 2521 is connected in electrical communication with a feedback comparator 2523 of the regulator control circuit 252 and may be configured, in such embodiments, to receive the signal indicative of the voltage of the reference voltage output 35 (e.g. via the reference voltage input 2521 and the potential divider of the reference voltage input 2521 if provided).

The feedback comparator 2523 may be further configured to receive selectively a signal representative of a voltage of the sensor voltage line 26.

The feedback comparator 2523 is configured, in the first mode of operation, to compare the signal indicative of the voltage of the reference voltage output 35 with the signal indicative of the voltage of the sensor voltage line 26 and to output a command signal which is configured to control the operation of the switching regulator 251 and, in particular embodiments, the power switch device 2511 of the switching regulator 251. The control of the operation of the switching regulator 251 may, in this first mode of operation, be to maintain a substantially constant voltage at the power switch device 2511, wherein substantial variations in the reference voltage are mirrored in the sensor voltage.

The feedback comparator 2523 may, therefore, include a comparator device 2523a, an input of which is configured to be connected in electrical communication with the reference voltage input 2521 (e.g. with the output of the potential divider thereof, if provided). The comparator device 2523a may have a second input which is configured to receive the signal indicative of the voltage of the sensor voltage line 26 (i.e. the sensor voltage).

The comparator device 2523a may be powered by the reference voltage output 35 in some embodiments—a filter capacitor 2523b may be used to reduce the effects of transient variations of the reference voltage output 35 on the operation of the comparator device 2523a and may, therefore, be connected in parallel with the power supply to the comparator device 2523a. A resistor 2523c may also be connected between an output of the comparator device 2523a and the reference voltage output 35.

In some embodiments, such as depicted in FIG. 4, the signal representative of the voltage in the reference voltage output 35 is connected in electrical communication with a non-inverting input of the comparator device 2523a and the signal representative of the sensor voltage is connected in electrical communication with the inverting input of the comparator device 2523a.

The signal representative of the sensor voltage may be produced by coupling of an input of the feedback comparator 2523 (e.g. one of the inputs of the comparator device 2523a such as the non-inverting input thereof) to the sensor voltage line 26. This coupling may be via one or more other components to modify the sensor voltage prior to provision to the feedback comparator 2523. For example, the coupling may be via one or more resistors and/or capacitors. In some embodiments, the coupling is via a potential divider to reduce the sensor voltage for provision to the feedback comparator 2523. In some embodiments, the coupling may additionally or alternatively be via one or more filtering circuits to improve the stability of the operation of the feedback comparator 2523 and/or other components which control the voltage of the sensor voltage line 26. For example, in the depicted embodiment, the sensor voltage line 26 is coupled to a voltage feedback circuit 2524 of the regulator control circuit 252 which provides feedforward compensation.

The voltage feedback circuit 2524 may, therefore, be configured to modify the sensor voltage (as mentioned above) for provision to the feedback comparator 2523.

In the depicted embodiment of FIG. 4, the voltage feedback circuit 2524 includes one or more resistors and/or capacitors arranged in a network. For example, the voltage feedback circuit 2524 may include a first and second resistor 2524a, 2524b which are connected in series between the sensor voltage line 26 and the ground connection or line 36. A further resistor 2524d may be connected in electrical communication with a terminal of the first resistor 2524a which is also connected to the second resistor 2524b. A capacitor 2524c may be connected between the other terminal of the further resistor 2524d and a terminal of a resistor 2522a of the current sense circuit 2522 which is also connected to the energy storage device 2512. The further resistor 2524d and the capacitor 2524c may be connected to an input to the feedback comparator 2523.

An input to the feedback comparator 2523 is, therefore, connected to the sensor voltage line 26 in some embodiments via the voltage feedback circuit 2524. That input to the feedback comparator 2523 may also be connected to the ignition or other power line 34 via a first drive switch circuit 2525 of the regulator control circuit 252.

The first drive switch circuit 2525 is configured to connect, selectively, the ignition or other power line 34 with the input to the feedback comparator 2523. The first drive switch circuit 2525 may, therefore, include a switch device 2525a which is actuated between an on-state in which the ignition or other power line 34 is connected in electrical communication with the input to the feedback comparator 2523 and an off-state in which the ignition or other power line 34 is disconnected from electrical communication with the input to the feedback comparator 2523.

The switch device 2525a of the first drive switch circuit 2525 may be a transistor device and may, in the depicted embodiment of FIG. 4, be a PNP transistor device. An emitter of the switch device 2525a may be connected in electrical communication with the ignition or other power line 34 and a collector may be connected in electrical communication, via a resistor 2525b of the first drive switch circuit 2525, to the input of the feedback comparator 2523.

As will be appreciated, therefore, the first drive switch device 2525a is configured, selectively, to connect a signal representative of the voltage of the ignition or other power line 34 (or another relatively high voltage line in some embodiments) to the feedback comparator 2523 at the input thereof which is otherwise configured to receive the signal indicative of the sensor voltage. In other words, the first drive switch device 2525a is configured to provide a current to the feedback comparator 2523 (i.e. to the comparator device 2523a thereof) which makes the comparator device 2523a output low.

Actuation of the first drive switch circuit 2525 may be controlled in some embodiments by a current feedback controller 2526 of the regulator control circuit 252. The current feedback controller 2526 is configured to control the operation of the first drive switch circuit 2525 between its on- and off-states dependent on a signal representative of the current flowing from the switching regulator 251 to the sensor voltage line 26 (i.e. the sensor current).

If the signal indicative of the sensor current is higher than a predetermined level, then the current feedback controller 2526 causes a change in the operation of the regulator control circuit 252 to the second mode of operation by taking over the provision of the input to the feedback controller 2526 (or otherwise influencing that input).

The predetermined level may be a predetermined operating current level for the switching regulator 251 for example.

The current feedback controller 2526 may include a switch device 2526a which may be a transistor device and may be an NPN transistor device (such as in the depicted embodiment of FIG. 4). An output of the current feedback controller 2526 may be connected in electrical communication with the first drive switch circuit 2525 to control its operation between the on- and off-states—as described above.

Accordingly, in some embodiments (e.g. as depicted in FIG. 4), the current feedback controller 2526 includes the switch device 2526a in the form of an NPN transistor device. The base and emitter of the switch device 2526 are connected in electrical communication with the current sense circuit 2522 and may be coupled by a capacitor 2526b of the current feedback controller 2526.

A resistor 2526c may be provided in series between the base of the switch device 2526 and the current sense circuit 2522.

The collector of the switch device 2526a of the current feedback controller 2526 may be connected to the ignition or other power line 34 via one or more resistors. In the depicted example, two such resistors are provided 2526d, 2526e with the first drive switch circuit 2525 (e.g. the base of the switch device 2525a of the first drive switch circuit 2525) connected between the two resistors 2526d, 2526e —which, therefore, form a potential divider.

The switch device 2526a of the current feedback controller 2526 has an on- and off-state (and, therefore, the current feedback controller 2526 also has an on- and off-state). As will be appreciated, with the current feedback controller 2526 in its on-state, the first drive switch circuit 2525 (i.e. the switch device 2525a thereof) is also in its on-state. Similarly, with the current feedback controller 2526 in its off-state, the first drive switch circuit 2525 (i.e. the switch device 2525a thereof) is also in its off-state.

Accordingly, therefore, as will be understood, the switch device 2526 of the current feedback controller 2526 and the switch device 2525a of the first drive switch circuit 2525 act as level translators in accordance with embodiments—such that the operation of some embodiments is maintained over a wide range of voltages on the ignition or other power line 34 and output by the current sense circuit 2522.

The current sense circuit 2522 is configured to output a signal indicative of the sensor current (i.e. the current downstream of the switching regulator 251), this may include current drawn by the one or more sensor 22 and/or any current due to the sensor voltage line 26 being short circuited to ground. The current sense circuit 2522 may, therefore, comprise a resistor 2522a of known resistance (and, in this example, a relatively low resistance such as 7.5 Ohms). The resistor 2522a of the current sense circuit 2522 and the capacitor 2514 form a filter which reduces ripple voltages in the sensor voltage line 26.

The current feedback controller 2526 may be connected in parallel with the current sense circuit 2522. As such, in the depicted embodiment of FIG. 4, the base and emitter of the switch device 2526a of the current feedback controller 2526 may be connected to respective opposing terminals of the resistor 2522a of the current sense circuit 2522.

As will be understood, therefore, the regulator control circuit 252 operates in a first mode of operation with the feedback comparator 2523 controlling the operation of the switching regulator 251 on the basis of the signal representative of the sensor voltage. However, when the sensor current exceeds the predetermined level, the current feedback controller 2526 operates to cause the feedback comparator 2523 to control the operation of the switching regulator 251 on the basis of the signal representative of the sensor current.

In embodiments including the third mode of operation, the third mode of operation may be triggered by the voltage of the sensor voltage line 26 being higher than a predetermined voltage indicative of a fault—such as a short circuit fault (e.g. shorted to a connection with a higher voltage, such as a power supply of the vehicle 1). This predetermined voltage may be a voltage which is predetermined and substantially fixed or may be a voltage which varies in accordance with variations in the reference voltage 35.

In particular, in some embodiments, the current feedback controller 2526 may operate, when the current exceeds the predetermined level, to actuate the first drive switch circuit 2525 to control the operation of the feedback comparator 2523 to turn the switching regulator 251 into its off-state until the current falls below the predetermined level again, at which point the state of the switching regulator 251 is determined by the voltage of the sensor voltage line 26 again. Such embodiments may be used to prevent or substantially reduce the risk of the switching regulator 251 being kept in its on state for a long period of time if the desired voltage at the sensor voltage line 26 cannot be achieved. In other words, constant current control takes over from constant voltage control in such scenarios.

Accordingly, in the first mode of operation, constant voltage control is used and, in the second mode of operation, constant current control is used.

The feedback controller 2526 may be configured to control the operation of the switching regulator 251 via a regulator drive circuit 2527 of the regulator control circuit 252. The regulator drive circuit 2527 is configured to receive the output from the feedback controller 2526 and to output a signal to control the switching regulator 251 in accordance with the output of the feedback comparator 2523.

The regulator drive circuit 2527 may, therefore, include a switch device 2527a which may be a transistor device and may be an NPN transistor device. The switch device 2517a is connected between the ground connection or line 36 and a control input of the switching regulator 251 (e.g. a base of the power switch device 2511). The switch device 2527a of the regulator drive circuit 2527 is configured to connect the control input to the switching regulator 251 into and out of electrical communication with the ground connection or line 36 selectively based on the output of the feedback comparator 2523. The regulator drive circuit 2527 may further include a pull-up resistor 2527b which is connected in electrical communication between the ignition or other power line 34 and the control input of the switching regulator 251. A further resistor 2527c may be provided in series between the control input and the switch device 2527a. Accordingly, in the depicted example of FIG. 4, the emitter of the switch device 2527a of the regulator drive circuit 2527 is connected in electrical communication with the ground connection or line 36, the collector is connected to the control input and the base is connected to the output of the feedback comparator 2523.

In some embodiments, a short circuit handling circuit 2528 is provided as part of the regulator control circuit 252 (the short circuit handling circuit 2528 may be configured in some embodiments to handle other faults or events too). The short circuit handling circuit 2528 may include a first diode 2528a which is coupled between the output of the reference voltage input 2521 (between the reference voltage input 2521 and the feedback comparator 2523) and the reference voltage output 35. The short circuit handling circuit 2528 may include a second diode 2528b which is coupled between the output of the voltage feedback circuit 2524 (between the voltage feedback circuit 2524 and the feedback comparator 2523) and the reference voltage output 35. In other words, both inputs of the feedback comparator 2523 may include respective diodes 2528a, 2528b which are connected in electrical communication between those inputs and the reference voltage output 35. The diodes 2528a, 2528b may be oriented to allow the flow of current from the inputs of the feedback comparator 2523 to the reference voltage output 35.

Accordingly, if the voltage of the sensor voltage line 26 exceeds the reference voltage output 35 (i.e. an over-voltage fault), then the second diode 2528b serves to clamp the sensor voltage line 26 voltage to just above the reference voltage output 35 (i.e. a clamp voltage). This will, in turn, cause the comparator device 2523a output to be low which will turn the switch device 2527a of the regulator drive circuit 2527 to its off-state, which disables the switching regulator 251 (i.e. keeps the power switch device 2511 in its off-state). This is the third mode of operation discussed herein.

The first diode 2528a may be configured to protect the comparator device 2523a—e.g. from high voltage transients (i.e. over-voltage transients) in the ignition or other power line 34—and is an example of an output voltage transient protection circuit.

Looking at the operation of the depicted embodiment in a short circuit condition in more detail, as the sensor current (i.e. the current drawn by the sensor voltage line 26) increases, the switching regulator 251 will be operated to increase the duty cycle of the power switch device 2511 so that more current is passed through to the sensor voltage line 26.

This increase in the sensor current will, of course, cause an increase in the current sensed by the current sense circuit 2522 (e.g. the voltage across the resistor 2522a thereof). As the voltage output by the current sense circuit 2522 reaches the base-emitter threshold of the switch device 2526a (i.e. a threshold voltage provided by a threshold sensor current), then the switch device 2526a will change to its on-state which will also change the switch device 2525a to change to its on-state. With the switch device 2525a in its on-state, a current will pass through the switch device 2525a and will forward bias the diode 2528b which will cause the output from the comparator device 2523a to be low. This turns the switch device 2527a to its off-state which turns the power switch device to its off-state. This rise of the sensor current will, therefore, cease, and the sensor current will decay as the energy storage element 2512 discharges.

Once the sensor current has decayed sufficiently to turn the switch device 2526a to its off-state, then the sequence will repeat. The switching frequency in this mode of operation is dependent on the energy storage device 2512 and the current sense circuit 2522.

In addition, in embodiments which include this short circuit handling capability, a hysteresis circuit may be provided as part of the feedback comparator 2325 or otherwise. This hysteresis circuit may include one or more resistors and/or capacitors. For example, in the depicted embodiment of FIG. 4, a capacitor 2323e and series resistor 2523d may be connected in electrical communication with the output of the comparator device 2523a and the inverting input thereof. As will be appreciated, the hysteresis circuit defines an upper bound and a lower bound.

In embodiments which include the fourth mode of operation (the hybrid pulse width and frequency modulation), when the sensor current is low, the voltage across the capacitor 2514 will increase to the upper bound of the comparator hysteresis threshold but may take longer than the pulse width modulation cycle to decay to the lower bound of the comparator hysteresis threshold. Accordingly, a modulation pulse which would have otherwise occurred may be skipped, which will reduce switching losses, and results in a lower switching frequency.

Embodiments of the present invention, therefore, provide a system by which multiple modes of operation can be achieved dependent on the sensor current. Embodiments of the present invention may also provide handling of fault currents and/or an output over-voltage. The transition between at least the first two modes of operation may, in some embodiments, be relatively smooth and the same may be true of the other modes of operation described herein.

Some embodiments also seek to reduce the issues caused by short circuits of the sensor voltage line 26 to the battery 31 or to the ground connection or line 36.

Some embodiments also seek to provide a relatively low power dissipation over a relatively wide range of voltages on the ignition or other power line 34.

Some embodiments further seek to provide a very low quiescent current when there is no load on the sensor voltage line 36.

Although embodiments have been described in relation to the provision of power for use by one or more analogue sensors 22, it will be appreciated that embodiments could be used in relation to the provision of power to other circuit elements which require a power supply with a voltage which tracks a reference voltage. Some such embodiments may be particularly useful in relation to vehicles 1 and vehicle sensors (which may output analogue signals but which may still require a power supply with a voltage which tracks a reference voltage).

As will be appreciated, the regulator control circuit 252 of some embodiments may form part of a sensor circuit, which may include the switching regulator 151 and one or more sensors which are each configured to receive electrical power via the switching regulator.

As will be appreciated, embodiments of the present invention seek to provide a tracking regulator control circuit which may, in some embodiments, tolerate one or more of current overloads, over-voltages applied to the regulated output without causing excessive power dissipation, or imposing current overloads or over-voltages on the power supply or voltage reference.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A sensor circuit including a regulator control circuit, a switching regulator, and at least one analogue sensor connected to an output of the switching regulator, wherein the regulator control circuit is configured to control the switching regulator and includes:

a feedback comparator configured to compare a signal representative of a reference voltage with a signal representative of a voltage output of the switching regulator and to output a control signal for controlling the operation of the switching regulator dependent on the signals received by the feedback comparator; and a current feedback controller connected to the feedback comparator and configured to receive a signal representative of a current output by the switching regulator and to determine whether the regulator control circuit adopts a first or second mode of operation based on the signal representative of a current output, such that:

in the first mode of operation, the control signal is for controlling the switching regulator in accordance with a constant voltage control scheme, in the second mode of operation, the control signal is for controlling the switching regulator in accordance with a constant current control scheme, and the analogue sensor is provided with power at a voltage which tracks the reference voltage and wherein the analogue sensor is configured to sense a parameter associated with the operation of a vehicle.

2. The sensor circuit according to claim 1, wherein the second mode is adopted when the signal representative of the current output by the switching regulator exceeds a predetermined current.

3. The sensor circuit according to claim 1, wherein the current feedback controller is configured to modify the signal representative of the voltage output of the switching regulator in order to cause the adoption of the second mode.

4. The sensor circuit according to claim 1, wherein the regulator control circuit further includes a first drive switch circuit which is configured to receive an output from the current feedback controller and selectively to control an input of the current feedback controller dependent on the output from the current feedback controller.

5. The sensor circuit according to claim 1, wherein the regulator control circuit further includes a regulator drive circuit which is configured to receive the output from the feedback comparator and to control the operation of the switching regulator in accordance with the output from the feedback comparator.

6. The sensor circuit according to claim 1, wherein the regulator control circuit is further configured to clamp the output of the switching regulator to a clamp voltage and to modify the control signal to disable the switching regulator when the signal representative of the voltage output of the switching regulator and the signal representative of the reference voltage indicate that the voltage output is higher than the reference voltage.

7. The sensor circuit according to claim 1, wherein the regulator control circuit further includes an output voltage transient protection circuit configured to protect the feedback comparator from high voltage transients in the output voltage.

8. The sensor circuit according to claim 1, wherein the current feedback controller is further configured to determine whether the regulator control circuit adopts a fourth mode of operation in which hybrid pulse width and pulse frequency modulation is used to control the operation of the switching regulator.

9. The sensor circuit according to claim 1, wherein the signal representative of the reference voltage is a signal representative of a reference voltage of an analogue-to-digital converter which is configured to receive an output from the at least one sensor.

10. The sensor circuit according to claim 1, wherein the analogue sensor is configured to sense the parameter associated with the operation of a vehicle other than the voltage of the power provided to the analogue sensor.

11. A braking system for a vehicle including a sensor circuit including a regulator control circuit, a switching regulator, and at least one analogue sensor connected to an output of the switching regulator, wherein the regulator control circuit is configured to control the switching regulator and includes:

a feedback comparator configured to compare a signal representative of a reference voltage with a signal representative of a voltage output of the switching regulator and to output a control signal for controlling the operation of the switching regulator dependent on the signals received by the feedback comparator; and a current feedback controller connected to the feedback comparator and configured to receive a signal representative of a current output by the switching regulator and to determine whether the regulator control circuit adopts a first or second mode of operation based on the signal representative of a current output, such that:

in the first mode of operation, the control signal is for controlling the switching regulator in accordance with a constant voltage control scheme, in the second mode of operation, the control signal is for controlling the switching regulator in accordance with a constant current control scheme, and the analogue sensor is provided with power at a voltage which tracks the reference voltage and wherein the analogue sensor is configured to sense a parameter associated with the operation of a vehicle.

12. The braking system according to claim 11, wherein the analogue sensor is configured to sense the parameter associated with the operation of a vehicle other than the voltage of the power provided to the analogue sensor.

13. A vehicle including a sensor circuit including a regulator control circuit, a switching regulator, and at least one analogue sensor connected to an output of the switching regulator, wherein the regulator control circuit is configured to control the switching regulator and includes:

a feedback comparator configured to compare a signal representative of a reference voltage with a signal representative of a voltage output of the switching regulator and to output a control signal for controlling the operation of the switching regulator dependent on the signals received by the feedback comparator; and a current feedback controller connected to the feedback comparator and configured to receive a signal representative of a current output by the switching regulator and to determine whether the regulator control circuit adopts a first or second mode of operation based on the signal representative of a current output, such that:

in the first mode of operation, the control signal is for controlling the switching regulator in accordance with a constant voltage control scheme, in the second mode of operation, the control signal is for controlling the switching regulator in accordance with a constant current control scheme, and the analogue sensor is provided with power at a voltage which tracks the reference voltage and wherein the analogue sensor is configured to sense a parameter associated with the operation of a vehicle.

14. The vehicle according to claim 13, wherein the analogue sensor is configured to sense the parameter associated with the operation of a vehicle other than the voltage of the power provided to the analogue sensor.

* * * * *

UNITED STATES PATENT AND TRADEMARK OFFICE
CERTIFICATE OF CORRECTION

PATENT NO. : 10,879,719 B2  
APPLICATION NO. : 16/086509  
DATED : December 29, 2020  
INVENTOR(S) : Steven Horton Page 1 of 1

It is certified that error appears in the above-identified patent and that said Letters Patent is hereby corrected as shown below:

On the Title Page

In Item (87), second line, please make the following correction:
PCT Pub. Date: Sept. 28, 2017

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*